(12) United States Patent
Ygnelzi et al.

(10) Patent No.: US 7,560,642 B2
(45) Date of Patent: Jul. 14, 2009

(54) TAMPER RESISTANT LOCKING CAP FOR UTILITY POLES AND METHOD

(76) Inventors: Gianni Ygnelzi, 714 S. First St., Las Vegas, NV (US) 89101; Emilio Ygnelzi, 714 S. First St., Las Vegas, NV (US) 89101

(*) Notice: Subject to any disclaimer, the term of this patent is extended or adjusted under 35 U.S.C. 154(b) by 1 day.

(21) Appl. No.: 11/872,453

(22) Filed: Oct. 15, 2007

(65) Prior Publication Data
US 2009/0095500 A1    Apr. 16, 2009

(51) Int. Cl.
*E04H 12/24* (2006.01)
(52) U.S. Cl. .......... 174/45 R; 174/46; 174/40 R; 174/45 TD; 174/40 CC; 52/101; 362/431
(58) Field of Classification Search ........... 174/45 R, 174/46, 40 R, 45 TD, 40 CC, 341, 43; 220/251, 220/284; 362/431; 81/125; 411/402; 52/736.1, 52/87, 198, 101, 40, 146; 191/32
See application file for complete search history.

(56) References Cited

U.S. PATENT DOCUMENTS 6,204,446 B1 * 3/2001 Parduhn .......... 174/45 R

* cited by examiner

*Primary Examiner*—Dhiru R Patel
(74) *Attorney, Agent, or Firm*—Jeffrey D. Moy; Weiss & Moy, P.C.

(57) ABSTRACT

A locking cap for a utility pole is provided to safeguard the metal wiring therein. The locking cap prevents access to the metal wiring through the access opening in the utility pole. The locking cap has a base that detachably mounts with one or more fasteners to a utility pole into and over the access opening and a locking shield that slidably engages with the base in a position overlying the one or more fasteners.

15 Claims, 14 Drawing Sheets

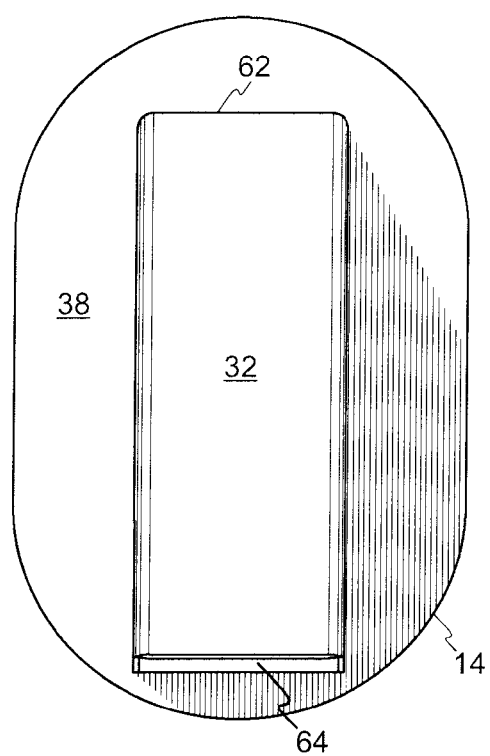
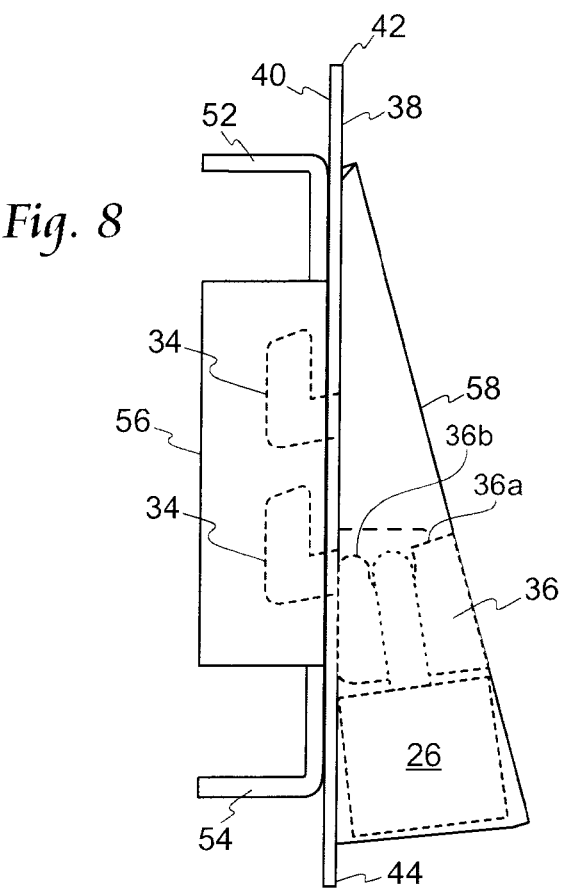

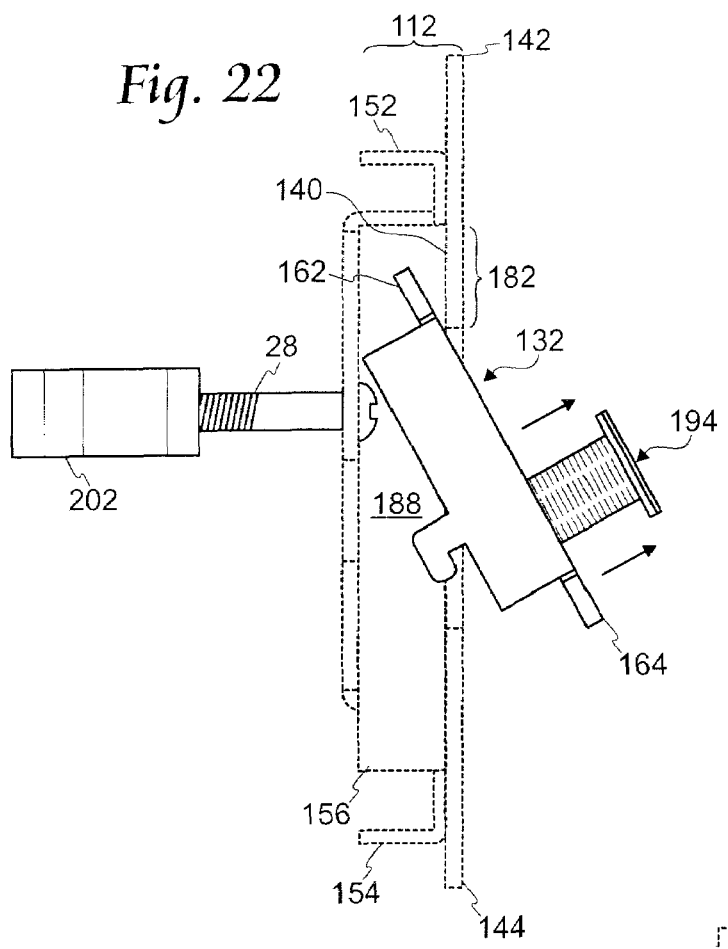
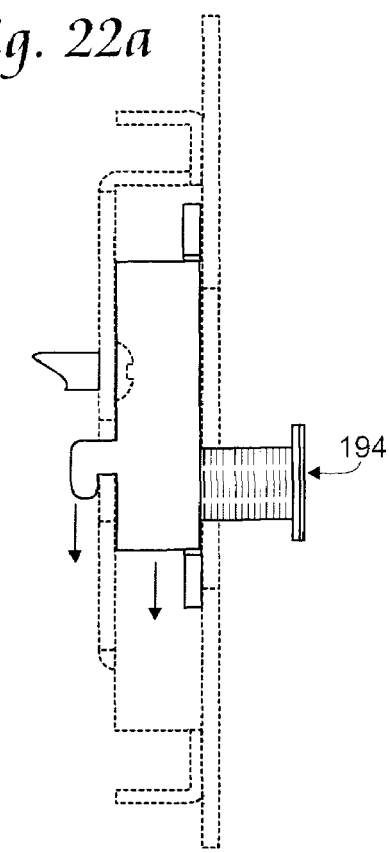
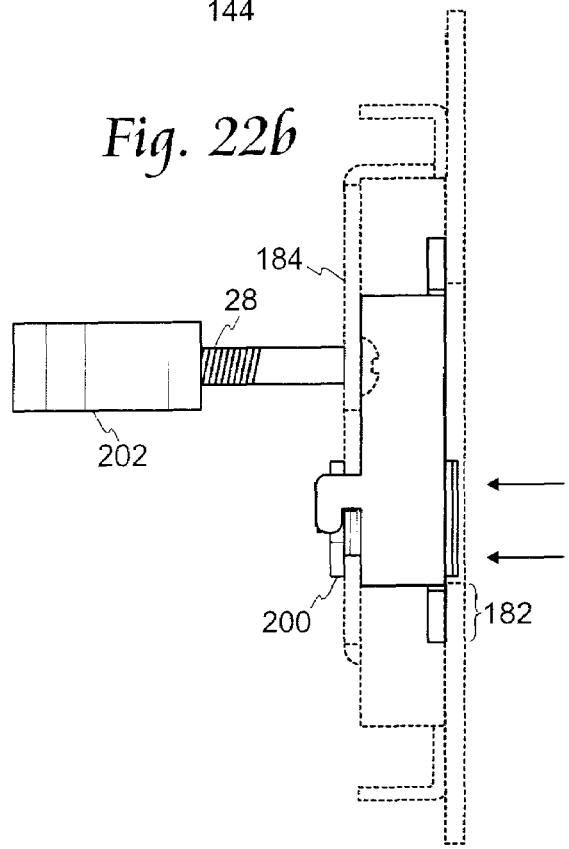
Fig. 22
Fig. 22a
Fig. 22b

TAMPER RESISTANT LOCKING CAP FOR UTILITY POLES AND METHOD

FIELD OF THE INVENTION

This invention relates generally to a theft prevention device and method. More specifically, this invention relates to a tamper resistant locking cap and method for safeguarding utility pole wiring.

BACKGROUND OF THE INVENTION

Metal theft, particularly copper theft but also aluminum, zinc, nickel and bronze theft is a growing problem. As the price for these metals escalates, they have become a target of thieves worldwide. Thieves are risking their lives and others' for metal. Thieves yank down live power lines and remove grounding wires from electrical substations, rail lines and wind farms. They steal wire from new housing and business park construction sites, or sometimes from existing houses. In many of these cases, they'll leave behind thousands of dollars in damage to extract a few hundred dollars' worth of metal.

Copper wire has been removed from utility poles, costing utility companies and their customers. Copper theft is expensive, causes power outages and if live electrical wires are exposed, children and pedestrians could suffer severe injuries or even death. In addition, because of these thefts, roadways and several major intersections have been made less safe for drivers and pedestrians because of the lack of lighting. The utility has to order new copper wire, wait for it to be delivered and then wait for available crews to re-install the copper wires. Copper theft is creating a dangerous situation and costing the state and taxpayers thousands of dollars that could otherwise be used on repaving highways, fixing potholes and a number of things.

The thieves are stealing the copper wiring from inside the utility poles. The utility poles typically comprise a pole shaft with an access opening in the wall thereof to permit authorized personnel access to the wiring for maintenance, repair and other services. The access opening is typically rectangular. Unfortunately, thieves pull the copper wires out through the access opening. The access opening is typically covered by a locking cap secured by a center screw. Thieves and vandals have been able to simply remove the center screw and locking cap to gain access to the wiring. Attempts to deter thefts and vandalism with prior art locking devices have not been entirely successful.

Accordingly, there has been a need for a novel locking cap and method which substantially prevent the theft of metal wiring from utility poles. There is also a need for a novel locking cap which is of simplified and sturdy construction, easy to install and that is substantially stronger, sturdier, and more secure than prior art locking devices. There is a still further need for a novel locking cap and method which are specifically designed to cover the access opening on a utility pole in a simple, straightforward, and effective manner to prevent unauthorized access to the wiring. The present invention fulfills these needs and provides other related advantages.

SUMMARY OF THE INVENTION

The present invention resides in an improved locking cap to safeguard the metal wiring in a utility pole. The locking cap prevents access to the metal wiring through the access opening in the utility pole. The locking cap comprises, generally, a base adapted to be detachably mounted to a utility pole by at least one fastener and having a plurality of slots therethrough, and a shield adapted to be locked to the base and having a plurality of hooks each adapted to slidably engage into the plurality of slots to position the shield over the at least one fastener.

In a preferred form of the invention, the base includes a cover plate and an underlying brace member with the plurality of slots vertically aligned therethrough. The cover plate and underlying brace member may further include at least one vertically aligned opening for receiving the at least one fastener. The cover plate has an upper end and a lower end. The brace member may be a substantially rectangular plate along a long axis and left and right side arms along a horizontal axis at right angles to the long axis with the top and bottom ends of the plate and the left and right side arms formed into rearwardly extending top, bottom and side flanges. A staple projects substantially perpendicularly from a front surface of the cover plate. A staple opening is provided in the staple for use with a detachable padlock.

The plurality of vertically aligned slots through the cover plate and underlying brace member may be disposed on opposing sides of the staple in opposing parallel pairs. The plurality of vertically aligned slots is each sized to slidably receive a corresponding one of the plurality of hooks. The at least one vertically aligned opening through the cover plate and underlying brace member may be proximate and above the staple and between the pairs of opposing parallel slots.

The shield includes a substantially rectangular front wall, and a pair of inclined sidewalls joined thereto and extending rearwardly therefrom. The shield has an upper end and a lower end. The sidewalls slope downwardly toward the upper end of the shield. The shield should have sufficient height and width to amply cover at least a shackle of the padlock and the at least one fastener when fully engaged and locked to the base.

The plurality of hooks may be substantially L- or J-shaped hooks that extend rearwardly from each of the free edges of the sidewalls. The placement of the plurality of hooks corresponds in lateral spacing and in vertical spacing to the positioning of the vertically aligned slots in the base. Each hook is dimensioned and shaped with a slight upward curve at the tip. The shield is horizontally slidable to enrage each of the hooks into a corresponding vertically aligned slot to provide a plurality of engagement points which further increases lock security.

A retaining flange projects at a right angle from the rear surface of the shield front wall in a slightly off center position. The retaining flange has a pair of prongs with the space therebetween sized to fit around the staple opening. The retaining flange slidably cooperates with the staple opening to secure the padlock therein to lock the shield to the base in a position overlying the lock and the at least one fastener.

The base is first mounted to the utility pole over the access opening. The top, bottom and side flanges of the brace member are inserted into the access opening in the utility pole with the cover plate overlying the access opening. The at least one fastener is secured in the at least one vertically aligned opening by a mounting bracket or the like within the utility pole. The padlock shackle is inserted through the staple opening and left in an unlocked but closed position. The padlock hangs down with the keyway at the bottom of the padlock. The shield is thereafter locked to the base by slidably engaging the plurality of hooks into the plurality of vertically aligned slots and inserting the retaining flange between the shackle and the lock body. The shield is slidable horizontally toward an upper end of the base until the retaining flange is stopped by the shackle and the plurality of hooks have reached their limit in the plurality of slots. The shackle is then snapped shut to lock the padlock with the shield covering at least the shackle of the padlock and the at least one fastener thus substantially preventing tampering therewith.

In another embodiment, the base comprises the cover plate, underlying brace member and a box-like member which may all be welded together to form a unitary base. The cover plate and brace member have substantially the same general configuration as in the preferred embodiment with substantially vertically aligned cutouts in substantially the center thereof. The cutout in the cover plate may be substantially square and the cutout in the underlying brace member may be substantially rectangular. The box-like member comprises a rear wall and forwardly extending top and bottom and side flanges. The edges of the flanges may be mounted to the rear surface of the cover plate substantially within and close to the boundaries of the brace member cutout to define, along with the cover plate and brace member cutouts, a substantially central forwardly-open recessed cavity. Due to the difference in length between the substantially square cover plate cutout and the substantially rectangular brace member cutout, the top and bottom edges of the cover plate cutout form a retaining lip that extends over the top and bottom edges of the recessed cavity. The plurality of slots may be defined in the box-like member. A cutout and at least one opening are provided in the rear wall of the box-like member. The at least one fastener is secured through the at least one opening to mount the base to the utility pole. The shield has a substantially rectangular front wall and a pair of rearwardly-extending side flanges with the plurality of hooks extending therefrom. The hooks slidably engage in the plurality of slots in the box-like member and the shield slidably engages into the recessed cavity. The shield is dimensioned to fit within and cover the recessed cavity to substantially prevent access to the at least one fastener. A cam lock extends through the front wall of the shield. A key is turned in a keyway of the cam lock pivoting the cam which has been moved behind the rear wall of the box-like member to a substantially perpendicular position with respect to the cutout in the rear wall of the box-like member to lock the shield to the base.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 7 is a front view of the locking cap of FIG. 1;

FIG. 8 is a side view of the locking cap of FIG. 1, illustrating in dotted lines the manner in which the plurality of hooks are slidably engaged into the plurality of corresponding vertically aligned slots in the base and a staple and retaining flange cooperate to hold the padlock;

FIG. 22 is a perspective environmental assembly view of the locking cap, mounting bracket and fasteners of FIG. 16, illustrating the manner in which an upper end of the shield is inserted into a recessed cavity in the base of the locking cap;

FIG. 22a is a further perspective assembly view similar to FIG. 22 illustrating the manner in which the shield slidably engages into the recessed cavity of the base with the upper and lower ends of the shield flush against the rear surface of the cover plate at the top and bottom edges of the cutout therein;

FIG. 22b is a further perspective environmental assembly view illustrating the manner in which the shield is fully engaged and locked to the base in a position overlying the fastener;

DETAILED DESCRIPTION OF THE PREFERRED EMBODIMENTS

Figure 1:
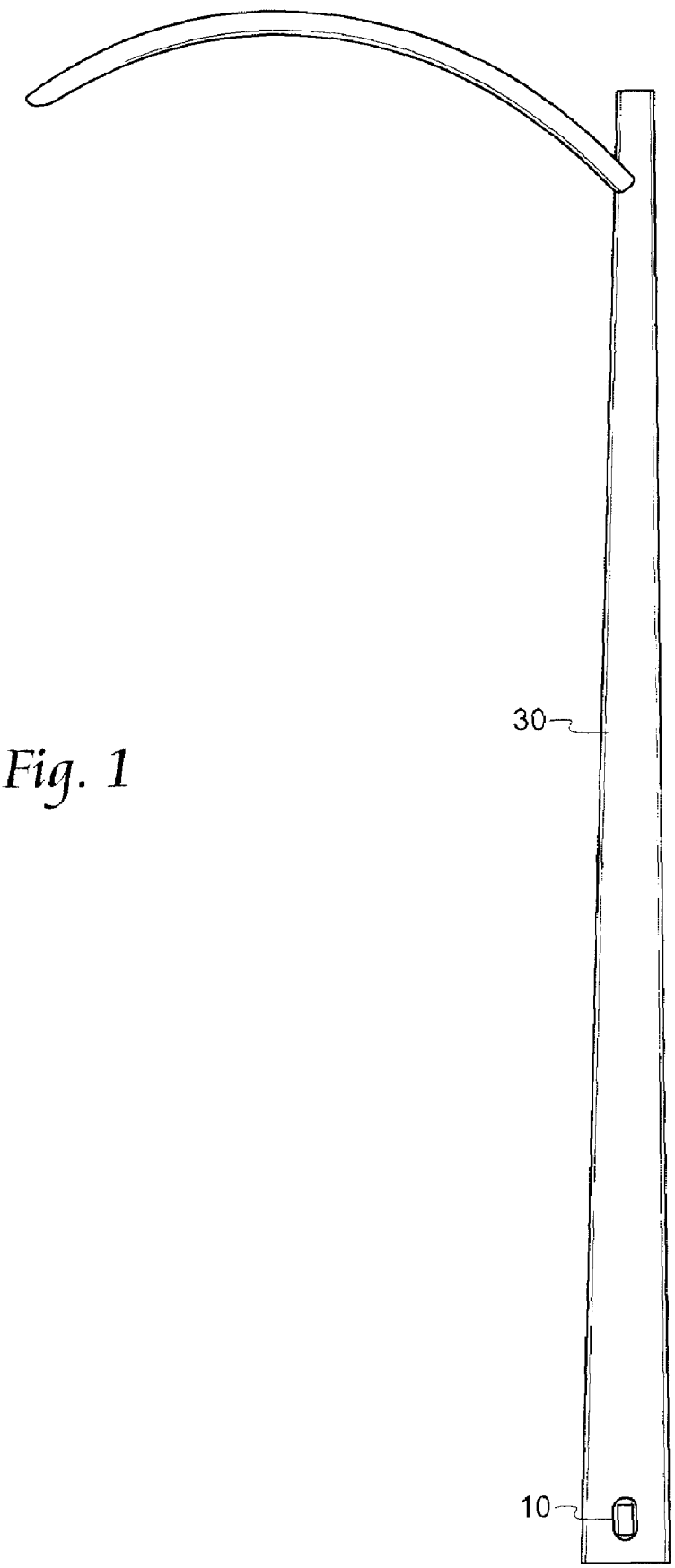
FIG. 1 is a perspective environmental view of a locking cap embodying the invention illustrating the locking cap mounted on a utility pole.

As shown in the drawings for purposes of illustration, the present invention is concerned with an improved utility pole locking cap, generally designated in the accompanying drawings by the reference number 10. The locking cap 10 comprises, generally, a base 12 comprising a cover plate 14 and an underlying brace member 16 with a plurality of vertically aligned slots 18 and at least one vertically aligned opening 20 therethrough, the cover plate 14 having a staple 22 projecting therefrom with a staple opening 24 for receiving a lock 26, wherein the at least one vertically aligned opening 20 is adapted to receive at least one fastener 28 for detachably mounting the locking cap 10 to a utility pole 30; and a shield 32 having a plurality of hooks 34 adapted to slidably engage into the plurality of vertically aligned slots 18 and a retaining flange 36 that slidably cooperates with the staple opening 24 to secure the lock 26 therein to lock the shield 32 to the base 12 in a position overlying the lock 26 and the at least one fastener 28.

In accordance with the present invention, and as illustrated with respect to a preferred embodiment in FIGS. 1 through 15, the improved locking cap 10 is configured for detachable mounting on a utility pole shaft (FIGS. 1 and 2) in a manner covering the access opening (not shown) therein. The locking cap 10 substantially prevents access to the lock 26 and the at least one fastener 28, thereby safeguarding the access opening (not shown) from intrusion and substantially reducing theft and damage caused by metal theft or attempted metal theft. As used herein, "utility poles" include street light poles for roadway and highway lighting applications.

Figure 3:
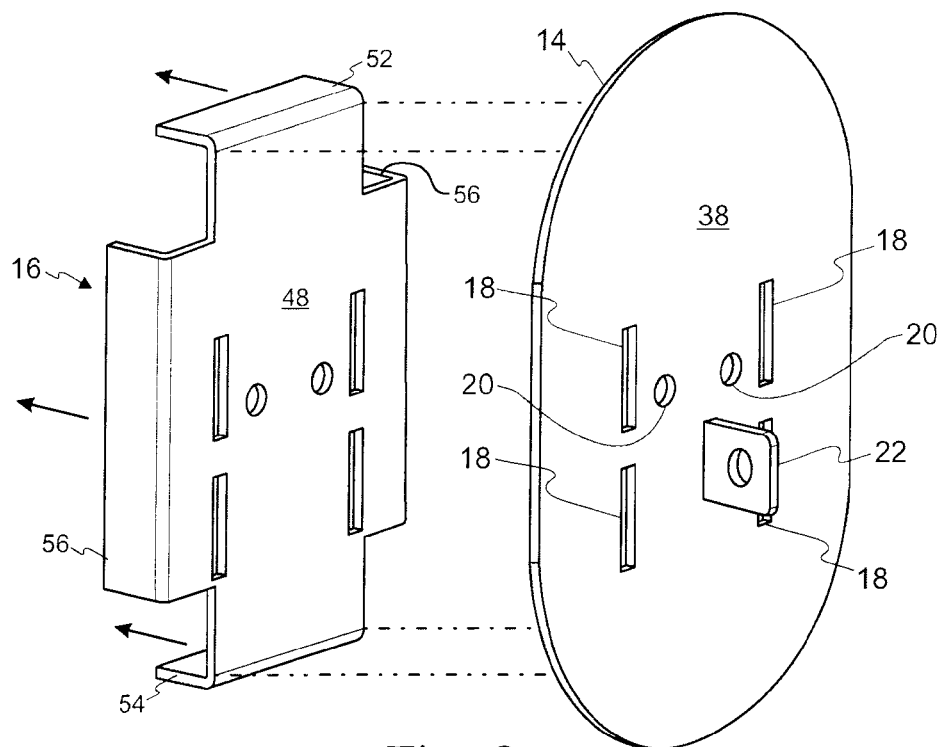
FIG. 3 is a perspective assembly view of the base of the locking cap of FIG. 1, illustrating a brace member being positioned on a rear surface of a cover plate.

As shown in FIG. 3, the cover plate 14 may be substantially planar with a front and rear surface 38 and 40. The thickness of the cover plate 14 may be up to 0.375 inches, preferably about 0.105 inches to about 0.135 inches. While these measurements have been provided, substantial benefit may be achieved by using a cover plate with a thickness outside this range. The cover plate 14 has an upper end and lower end 42 and 44. The cover plate 14 may be sized larger than the access opening in order to cover the access opening when the base 12 is detachably mounted to the utility pole. While an oval cover plate 14 is shown in the figures, it is to be appreciated that the cover plate 14 may be any shape as long as it amply covers the access opening.

The staple 22 extends substantially perpendicularly from the cover plate front surface 38. The staple may take the form of a right angle bracket. The staple may be welded, integrally formed with the cover plate 14 or otherwise fixed securely thereto. The staple may be disposed slightly below the midline of the vertical axis of the cover plate 14 (i.e. closer to the lower end 44) and substantially in the center of the horizontal axis. The staple may be dimensioned such that it does not extend too far from the front surface 38 of the cover plate 14 for purposes as described hereinafter.

Figure 15:
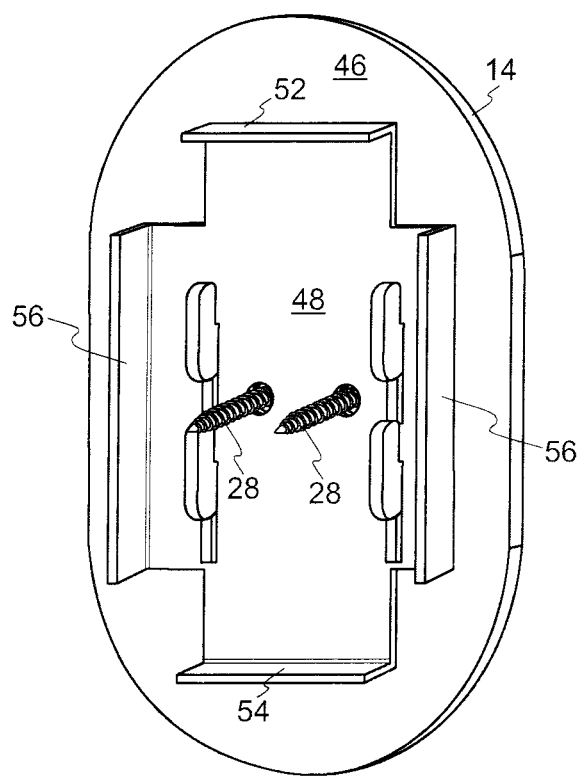
FIG. 15 is a rear view of the locking cap of FIG. 1, illustrating screws through the pair of vertically aligned openings in the base.

The underlying brace member 16 may be fixed by welding or the like to the rear surface of the cover plate 14 in substantially the center thereof. FIG. 3 illustrates how the cover plate 14 and underlying brace member 16 come together and may be welded together (as shown by the dotted lines in FIG. 4) to form the base (FIG. 5). The footprint of the underlying brace member 16 may be substantially rectangular and smaller than the cover plate 14 i.e. the cover plate 14 has a border 46 that extends beyond and around the footprint of the brace member 16 as shown in FIG. 15. The shape and footprint size or perimeter of the underlying brace member 16 corresponds to the shape and size of the access opening for purposes as described hereinafter. The brace member 16 may be a substantially rectangular plate 48 along a long axis and left and right side arms 50 along a horizontal axis at right angles to the long axis with the top and bottom ends of the plate 48 and the left and right side arms 50 formed into rearwardly extending top, bottom and side flanges 52, 54, and 56. The brace member 16 substantially prevents lateral movement of the cover plate 14 when the base 12 is mounted to the utility pole 30.

Figure 4:
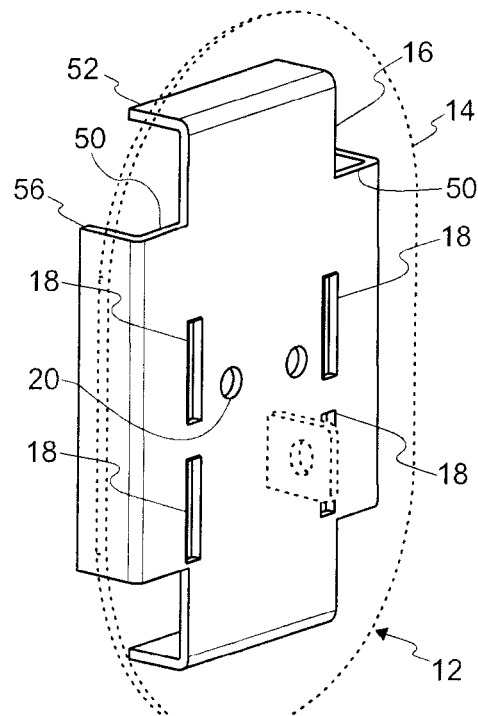
FIG. 4 is a further perspective assembly view of the base of FIG. 3, illustrating the brace member welded to the rear surface of the cover plate (in dotted lines)
Figure 5:
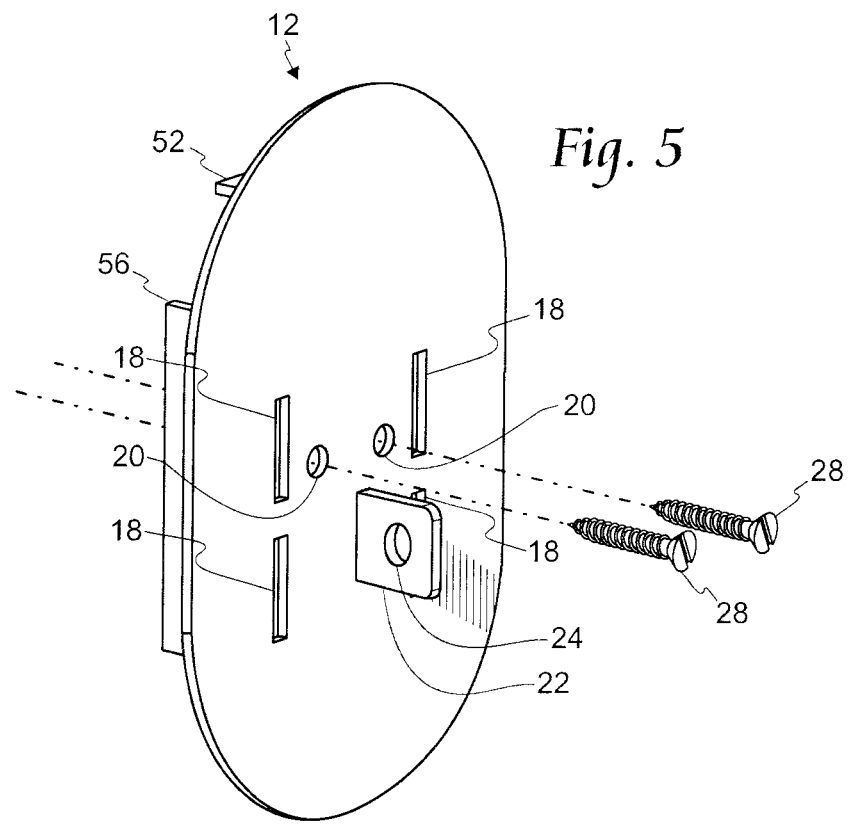
FIG. 5 is a perspective view of the base of FIG. 4, illustrating insertion of a pair of screws into a pair of openings therein for mounting the base to a utility pole (not shown)

The plurality of vertically aligned slots 18 through the cover plate 14 and underlying brace member 16 may be disposed on opposing sides of the staple 22 as shown in FIG. 4. While two pairs of parallel slots are shown in the figures, it is to be appreciated that substantial benefit may be achieved by other arrangements and number of slots. The plurality of vertically aligned slots 18 is each sized to slidably receive a corresponding one of the plurality of hooks 34 to provide a plurality of engagement points 68 (See FIG. 12 for the encircled regions). It is believed that an increase in the number of engagement points provides increased lock security.

The at least one vertically aligned opening 20 through the cover plate 14 and underlying brace member 16 may be proximate and above the staple 22 and between the pairs of parallel slots.

Figure 6:
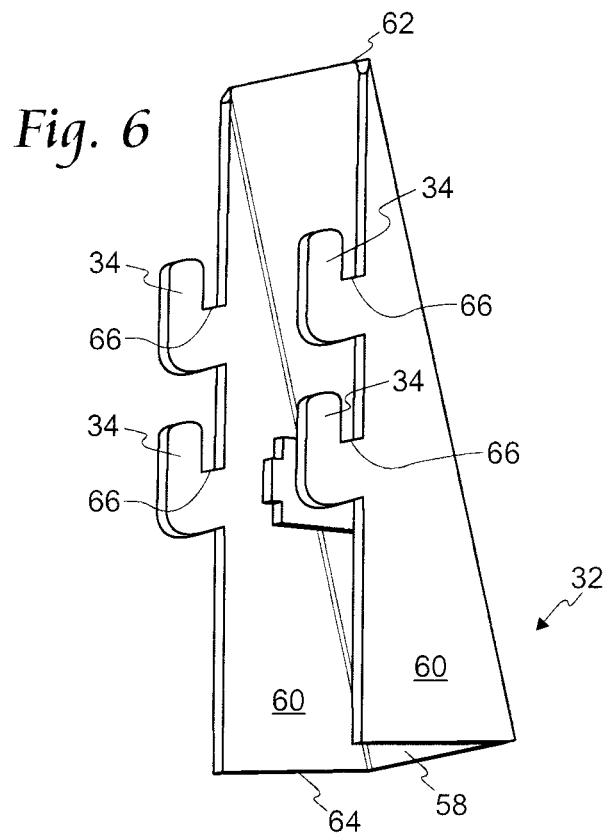
FIG. 6 is a perspective view of a shield of the locking cap of FIG. 1.

As shown in FIG. 6, the shield 32 may be substantially U-shaped as viewed from the lower end 64 and includes a substantially rectangular front wall 58, and a pair of inclined sidewalls 60 joined thereto and extending rearwardly therefrom. The shield has an upper end and a lower end 62 and 64. The sidewalls 60 slope downwardly toward the shield upper end 62 as shown in FIGS. 2, 6, 8 and 11-14. The shield 32 should have sufficient height and width to amply cover the lock 26 and the at least one fastener 28 when fully engaged and locked to the base 12.

Figure 12:
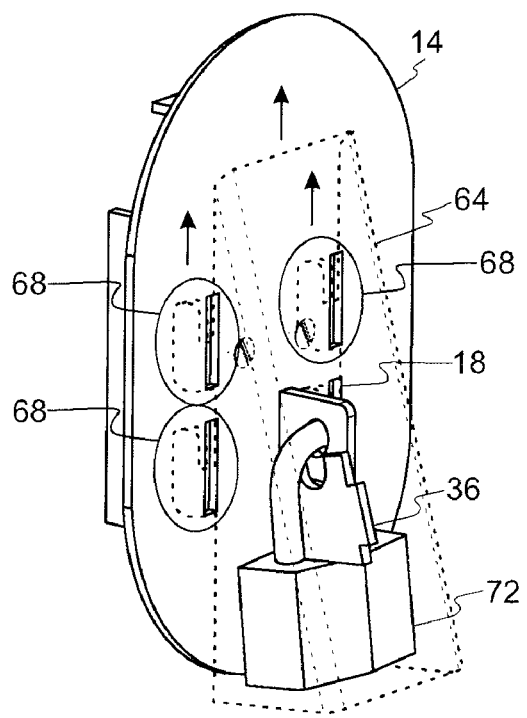
FIG. 12 is a further assembly view of the locking cap of FIG. 1, illustrating the manner in which the shield slidably engages with the base.
Figure 13:
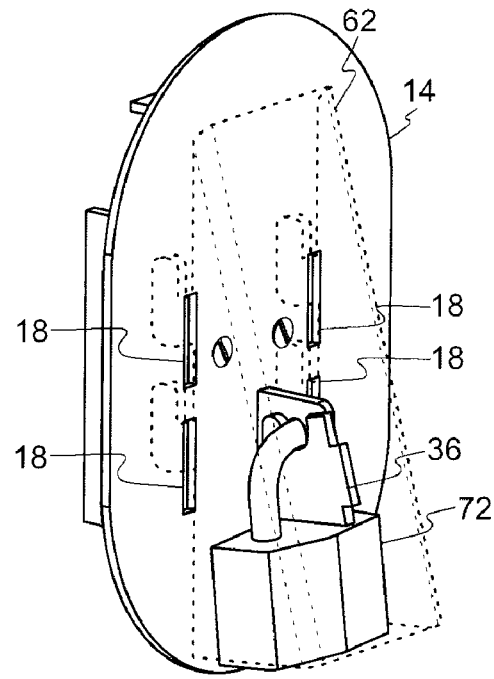
FIG. 13 is a further assembly view of the locking cap of FIG. 1 in a fully engaged position with the padlock in a closed, locked position with the shield overlying the plurality of fasteners and the padlock.

As shown in FIG. 6, the plurality of hooks 34 may be substantially L- or J-shaped hooks that extend rearwardly from each of the free edges of the sidewalls 60. The placement of the plurality of hooks 34 corresponds in lateral spacing and in vertical spacing to the positioning of the vertically aligned slots 18 in the base 12. As with the plurality of vertically aligned slots 18, the hooks 34 may be arranged in pairs of parallel hooks or in some other arrangement and in any other number. Each hook is dimensioned and shaped with a slight upward curve 66 (See FIG. 6). The shield is horizontally slidable to engage each of the hooks into a corresponding vertically aligned slot 18 to provide the plurality of engagement points 68 (FIG. 12).

Figure 11:
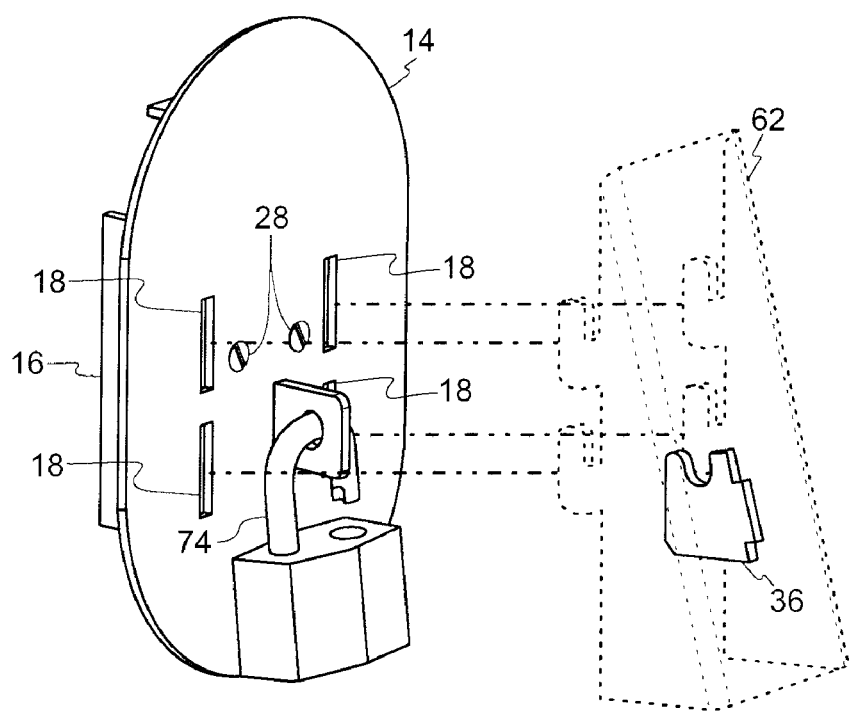
FIG. 11 is an assembly view of the locking cap of FIG. 1, illustrating the manner in which the shield is first positioned with respect to the base and the padlock shackle IS in an open, unlocked position.

As shown in FIG. 11, the retaining flange 36 projects at a right angle from a rear surface of the shield front wall 58 in a slightly off center position. The retaining flange has a pair of prongs 36a and 36b with the space therebetween sized to partially frame the staple opening when the shield is locked to the base (FIG. 8). While the staple 22 has been described as being substantially in the center of the cover plate horizontal axis and the retaining flange 36 in a slightly off center position, substantial benefit may be derived reversing their positions or even adjusting their positions so long as they abut each other when in a locking position as hereinafter described.

The locking cap 10 is for use with a detachable padlock 26. The most common padlock is of the type which includes a lock body 72 and a hinged inverted U-shaped shackle 74 at the top with a keyway 76 at the opposing bottom. The shackle diameter is sized smaller than the staple opening and the vertical and horizontal clearances of the shackle large enough to permit insertion of the retaining flange 36 therethrough while the shackle 74 is in an unlocked, but closed position but refuse withdrawal of the retaining flange 36 when locked. To increase security, it is preferred that the lock body not hang below the lower end of the base.

Figure 2:
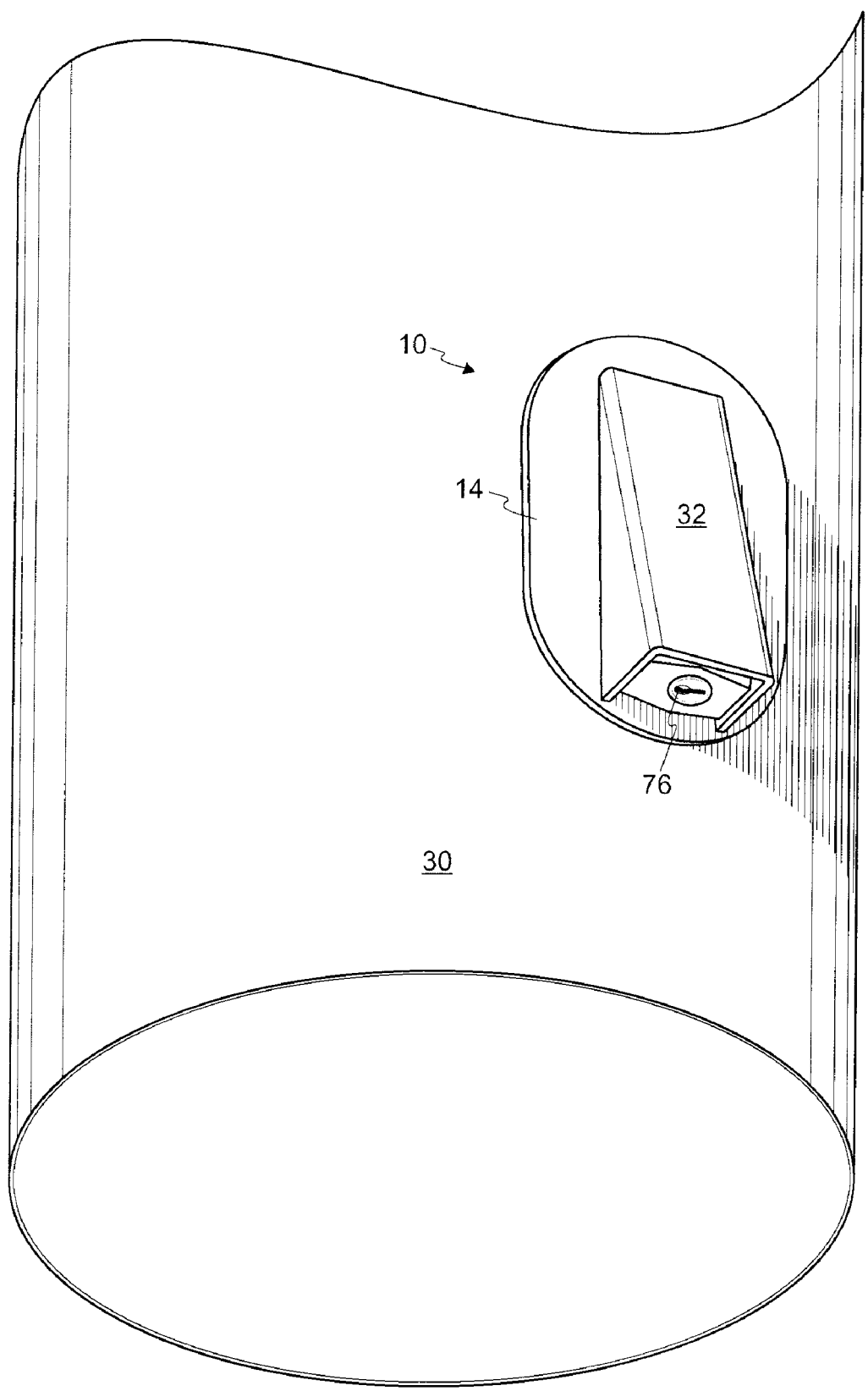
FIG. 2 is an enlarged environmental view of the locking cap of FIG. 1 mounted on the utility pole.
Figure 23:
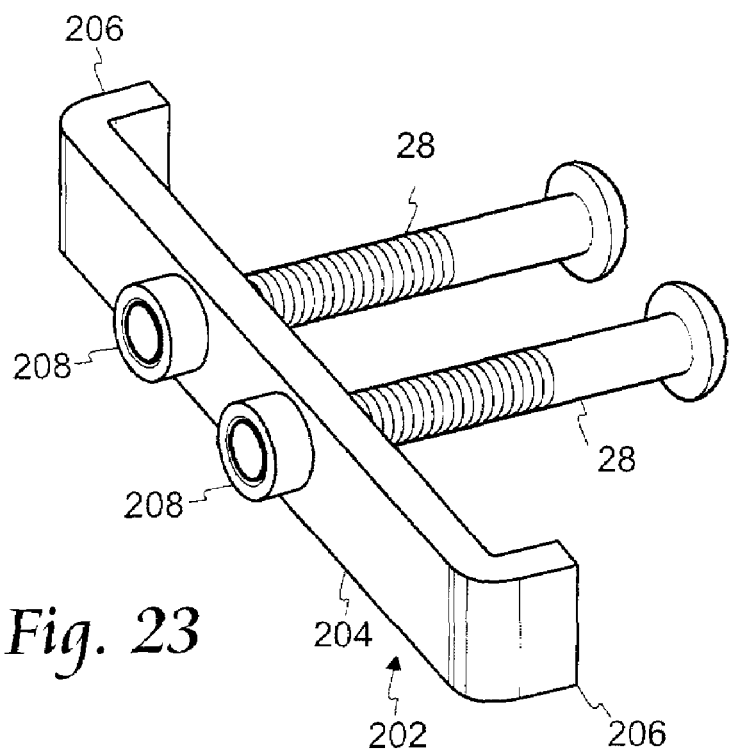
FIG. 23 is a perspective view of the exemplary mounting bracket of FIGS. 16-18.
Figure 23A:
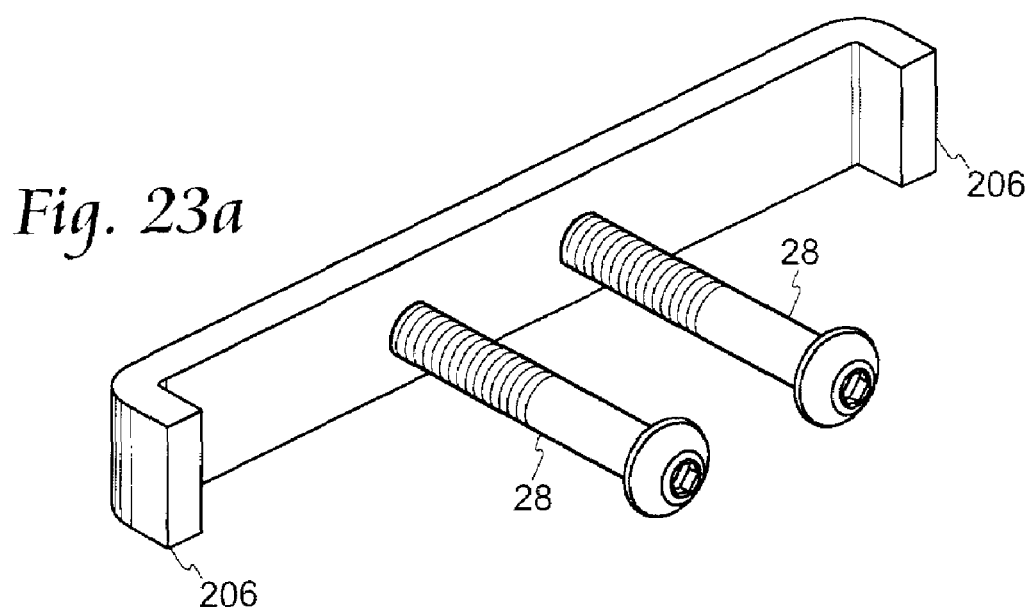
FIG. 23a is another perspective view of the exemplary mounting bracket of FIG. 23.

In use, the base 12 is mounted to the utility pole 30 by first orienting the lower end 44 of the cover plate toward the bottom of the utility pole 30 and inserting the top, bottom and side flanges 52, 54, and 56 of the brace member 16 into the access opening (not shown) in the utility pole with the cover plate 14 overlying the access opening in the utility pole. The user tightens the at least one fastener 28 through the at least one opening until the base 12 is securely mounted to the utility pole and the rear surface of the cover plate border 46 sits flush against the wall of the pole shaft (FIG. 2). The at least one fastener 28 may be screws or the like. A pair of screws is shown in FIG. 5. The at least one fastener 28 may be secured by a mounting bracket 202 or the like within the utility pole. An exemplary mounting bracket is shown in FIGS. 23 and 23a. The base is thus mounted to the utility pole.

Figure 9:
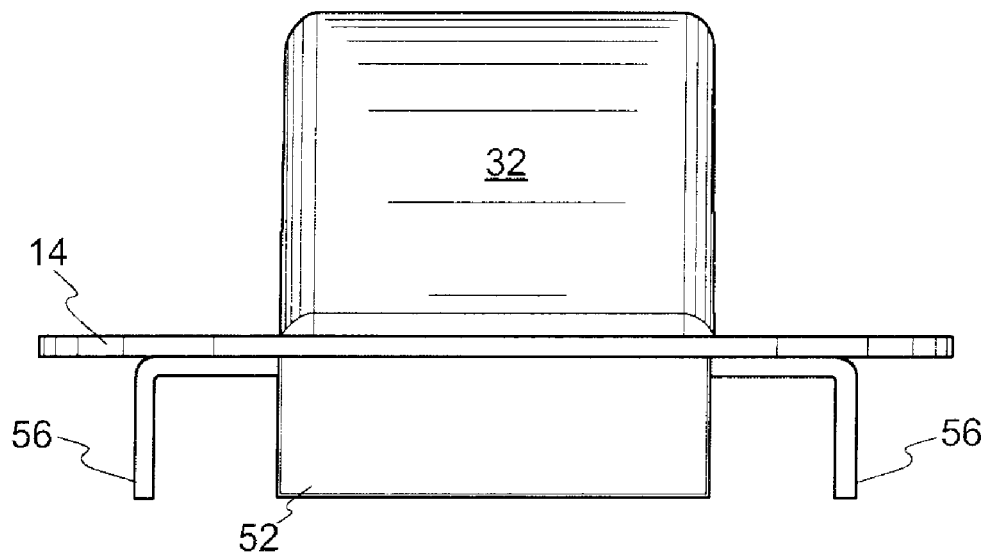
FIG. 9 is a top view of the locking cap of FIG. 1.
Figure 10:
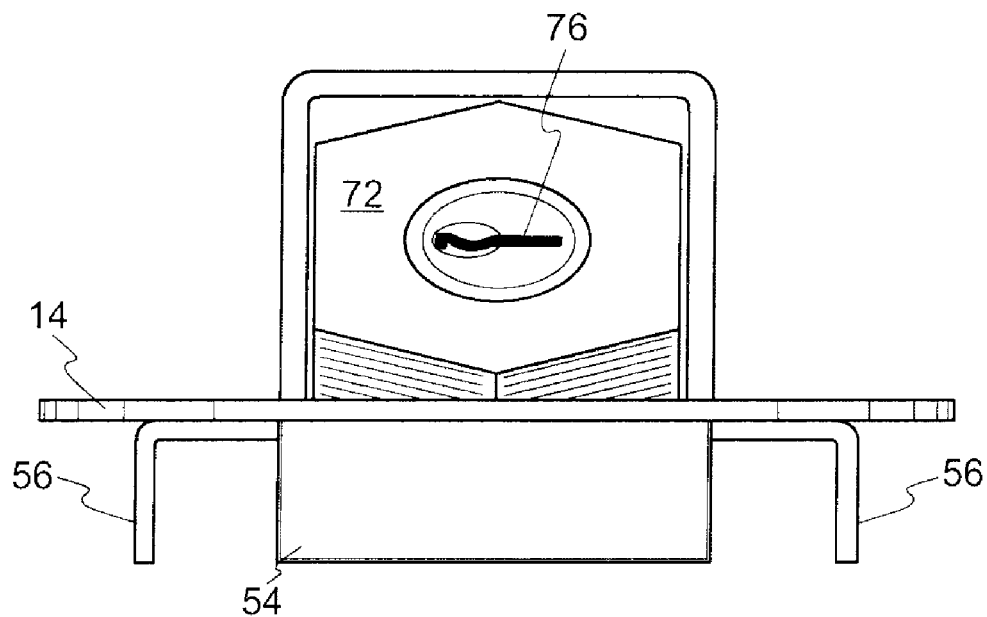
FIG. 10 is a bottom view of the locking cap of FIG. 1, illustrating the shield overlying the padlock.
Figure 14:
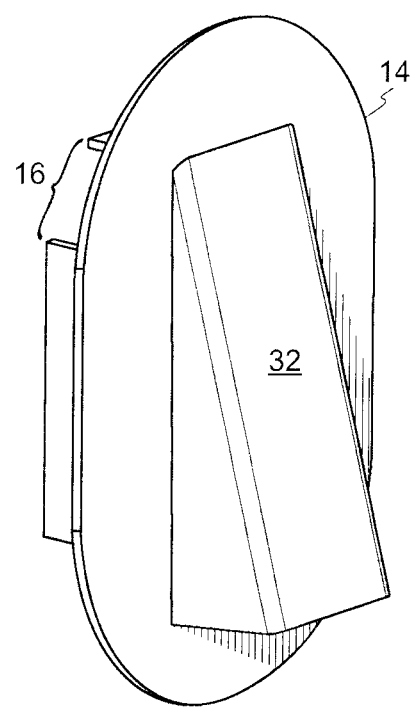
FIG. 14 is a perspective view of the locking cap of FIG. 1.

As shown in FIG. 11, the padlock shackle 74 is inserted through the staple opening 24 and left in an unlocked, but closed position. The padlock 26 hangs down with the keyway 76 at the bottom of the padlock. The shield 32 is thereafter detachably mounted to the base 12 by first orienting the lower end 64 of the shield with the lower end of the cover plate 44. The plurality of hooks 34 is inserted into the corresponding vertically aligned slots 18 and the retaining flange 36 inserted between the shackle 74 and the lock body 72 i.e. into the vertical and horizontal clearance space (FIG. 12). The shield 32 is slidable horizontally toward the upper end 42 of the cover plate until the retaining flange 36 is stopped by the shackle 74 and the hooks 34 have reached their limit in the plurality of slots 18 (FIG. 12). In this position, the free edges of the sidewalls 60 will be substantially flush against the front surface 38 of the cover plate with the upper end 62 of the shield substantially flush against the front surface 38 of the cover plate at its upper end 42 (FIG. 8). The shackle 74 is then snapped shut to lock the padlock 26 with the shield 32 covering at least the shackle portion of the padlock and preferably the lock body and the at least one fastener 28 (See FIGS. 10 and 13). The height of the staple 22, plurality of hooks 34, and retaining flange 36 may be dimensioned to provide limited clearance space between the shield 32 and the cover plate 14 to substantially prevent entry of bolt cutter jaws. The locking cap is shown in FIGS. 7, 9 and 14 among other figures.

Access to the utility pole wiring may be necessary for maintenance and repair. An authorized user would turn a key (not shown) in the exposed keyway 76 to unlock the padlock 26. The shield 32 could then be slid horizontally toward the bottom end of the cover plate to disengage the hooks 34 and free the retaining flange 36 from the confines of the unlocked shackle 74. The shield 32 may then be removed from the base 12 thus exposing the at least one fastener 28 to removal tools. The locking cap 10 may thus be removed from the utility pole 30 to uncover the access opening to access the wiring.

While the staple has been described as projecting from the base 12 and the retaining flange and plurality of hooks from the shield, substantial benefit may be derived from reversing their placement i.e. projecting the staple from the front wall rear surface of the shield and the plurality of hooks and retaining flange from the cover plate of the base 12. In use, this arrangement would permit the shield to be horizontally slidable in the reverse direction i.e. toward the bottom end of the cover plate in order to detachably fasten the shield to the base 12.

Figure 16:
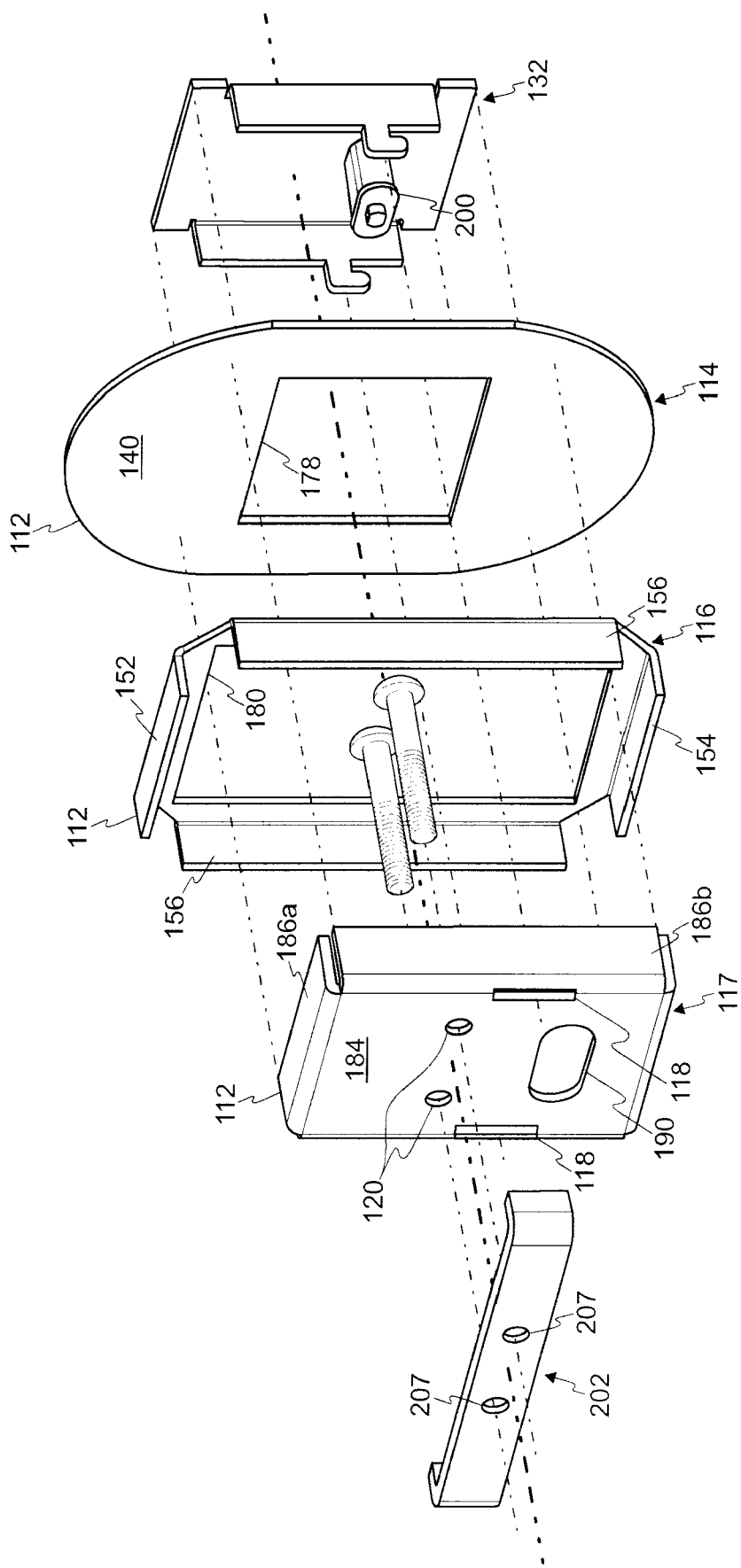
FIG. 16 is a perspective assembly view of the locking cap of another embodiment along with an exemplary mounting bracket and fasteners.
Figure 17:
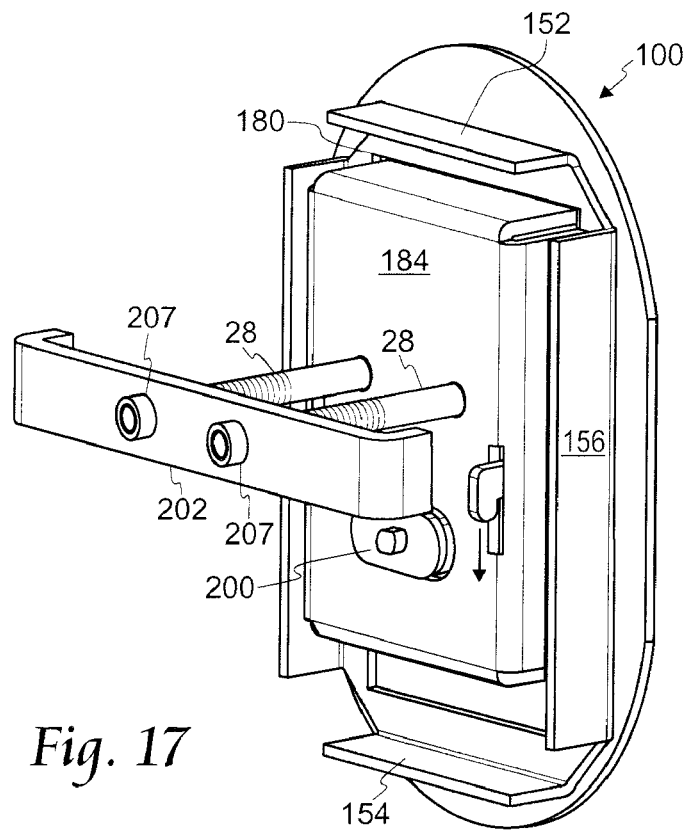
FIG. 17 is a rear perspective view of the locking cap of FIG. 16, illustrating a cam of a cam lock in an unlocked, parallel position to the cutout in the box-like member.
Figure 18:
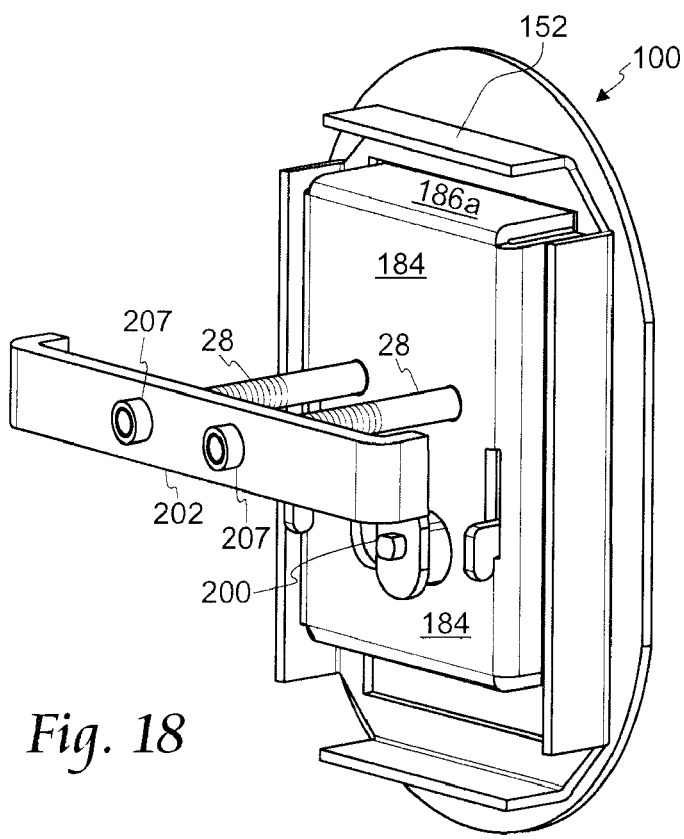
FIG. 18 is another rear perspective view of the locking cap of FIG. 16 along with the exemplary mounting bracket and fasteners; illustrating the cam in a locked, perpendicular position to the cutout behind the rear wall of the box-like member.
Figure 19:
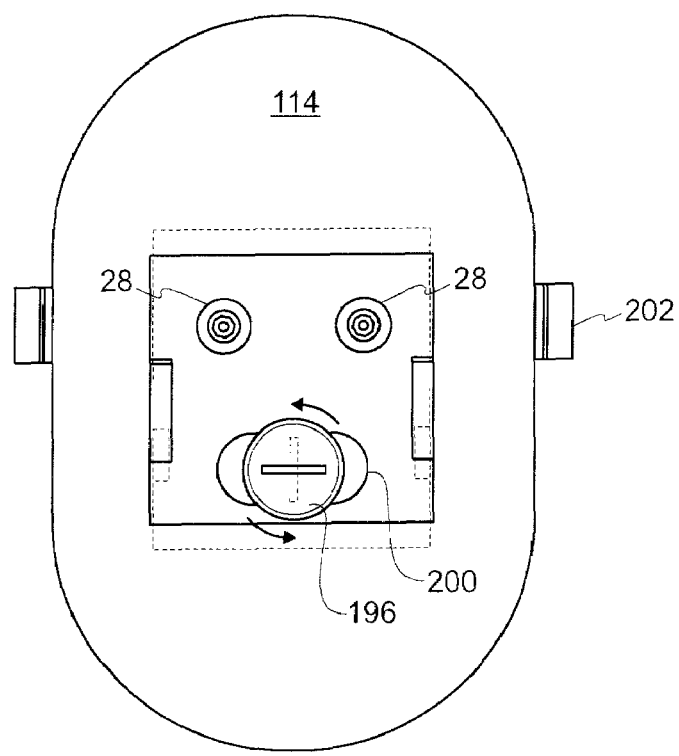
FIG. 19 is a front view of the locking cap of FIG. 17, illustrating the unlocked shield in position within the recessed cavity in a mounted base.
Figure 20:
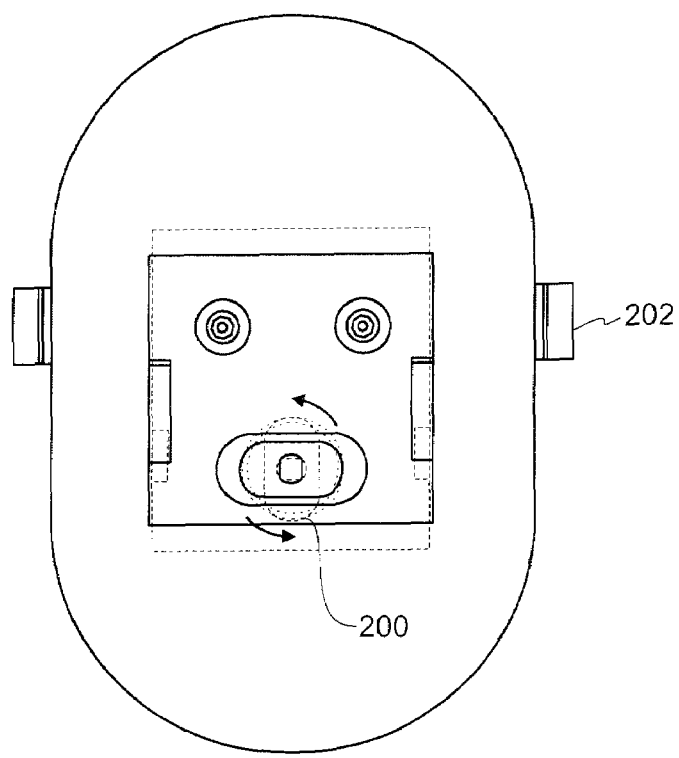
FIG. 20 is a front view of the locking cap of FIG. 18, illustrating the shield in a locked position.

Another embodiment of a locking cap 100 is shown in FIGS. 16-22b. As shown in FIG. 16, a base 112 of locking cap 100 includes a substantially planar cover plate 114, an underlying brace member 116 with top and bottom flanges 152 and 154 and side flanges 156, and a box-like member 117 mounted to a rear surface 140 of the cover plate 114 as hereinafter described to define the base. While a substantially oval cover plane is shown, it is to be appreciated that the cover plate 114 may be a different shape. The cover plate 114 is dimensioned to cover the access opening (not shown) in the utility pole 30. The underlying brace member 116 may be fixed by welding or the like to the rear surface 140 of the cover plate 114 in substantially the center thereof. FIG. 16 illustrates how the cover plate 114, underlying brace member 116, and box-like member 117 may be welded together (as shown by the dotted lines in FIG. 16) to form effectively a one-piece base 112 (FIGS. 17 and 18). A substantially square cutout 178 is provided in substantially the center of a cover plate 114 of locking cap 100. A vertically aligned substantially rectangular cutout 180 is provided in substantially the center of the underlying brace member 116 of locking cap 100. The width of cutouts 178 and 180 may be substantially the same.

As shown in FIGS. 17-18, the box-like member 117 may be mounted (by welding or the like) to the rear surface 140 of the cover plate 114 and disposed within the boundaries of the cutout 180 to define a unitary base. The box-like member 117 comprises a rear wall 184 spaced apart from the cover plate 114, and a forwardly extending top flange (186a), bottom flange (not shown), and side flanges (one shown as 186b) (FIG. 16). The edges of the flanges may be welded to the rear surface 140 of the cover plate substantially within and close to the boundaries of the brace member cutout 180 to define, along with the cover plate and brace member cutouts, a substantially central forwardly-open recessed cavity 188 (FIG. 22). Due to the difference in length between the substantially square cover plate cutout 178 and the substantially rectangular brace member cutout 180, the top and bottom edges of the cover plate cutout 178 form a retaining lip 182 that extends over the top and bottom edges of the recessed cavity 188. A plurality of slots 118 are defined in the box-like member 117 substantially at the juncture of the rear wall and the side flanges. A pair of slots 118 is shown in FIGS. 16-20. The rear wall 184 includes a substantially oval cutout 190 therein and a plurality of openings 120. The plurality of openings are adapted to receive at least one fastener 28 for detachably mounting the base 112 to the utility pole 30 in the same manner as locking cap 10.

Figure 21:
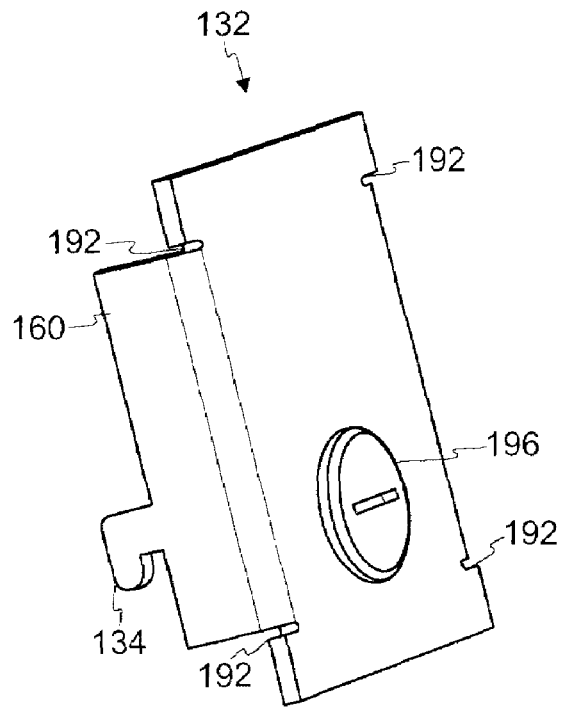
FIG. 21 is a perspective view of the shield of the locking cap of FIG. 16.
Figure 21A:
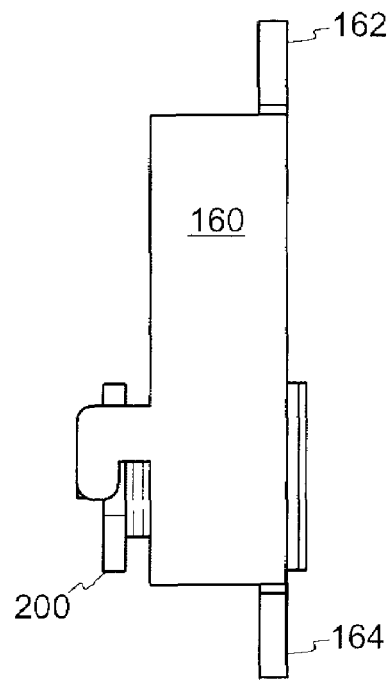
FIG. 21a is a side view of the shield of FIG. 21, illustrating the cam lock in a locked position.
Figure 21B:
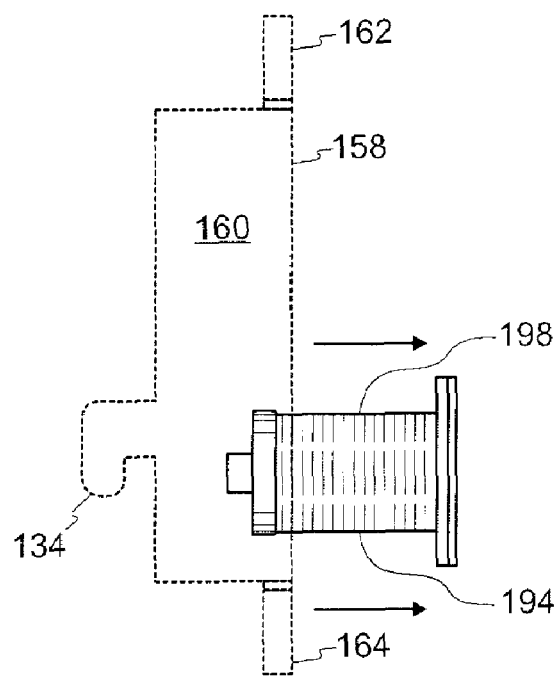
FIG. 21b is another side view of the shield of FIG. 21, illustrating the cam lock in an unlocked position.

As shown in FIGS. 21-21b, the shield 132 of locking cap 100 comprises a substantially rectangular front wall 158, and a pair of rearwardly-extending side flanges 160 having a plurality of substantially L- or J-shaped hooks 134 extending rearwardly from edges thereof. The hooks 134 correspond in vertical and lateral spacing with the plurality of slots 118 in the box-like member 117. While a pair of hooks 134 is shown in FIGS. 21 and 21b, it is to be appreciated that a greater number of hooks may be used with a corresponding increase in the number of slots 118 in the box-like member 117. The front wall 158 of the shield 132 is dimensioned to be slightly longer than the substantially square cutout 178 in the cover plate 114 but not to exceed the length between top and bottom flanges 186a and 186b in the box-like member 117. Notches 192 may be provided in the shield 132 in the corners between the front wall 158 and the rearwardly extending side flanges 160.

As shown in FIGS. 21 and 21b a cam lock 194 having a keyway 196, lock core 198 and a cam 200 fixed to the core is provided through an opening (not shown) in the front wall 158 of the shield 132. The keyway 196 faces the front of the shield 132. A key (not shown) enables the cam 200 to rotate as the key rotates, usually through 90° to engage behind the rear wall 184 of the box-like member 117 to lock the shield 132 into position in the recessed cavity 188. The core 198 is moveable horizontally between a substantially flush locked position (FIG. 22b) and a forwardly extended unlocked position (FIGS. 22 and 22a).

In use, the base 112 of locking cap 100 is first mounted by the at least one fastener 28 to the utility pole 30 in the same manner as locking cap 10. An exemplary mounting bracket 202 for use with the locking cap 100 is shown in FIGS. 16, 22, 22b, 23 and 23a. The mounting bracket 202 as shown in these figures comprises a substantially rectangular body 204 terminating at each end in a flange 206. Openings 207 in substantially the center of the substantially rectangular body 204 receive the at least one fastener 28 and are each secured therethrough by a locking nut 208. The flanges 206 bear against the access opening (not shown) in the utility pole to provide a secure fit for the locking cap 110 in order to provide increased security. While the mounting bracket 202 in FIGS. 23 and 23a has been described for use with the locking cap 100, it is to be appreciated that the mounting bracket 202 may also be used with locking cap 10.

The shield 132 is thereafter locked to the base 112 by first orienting a lower end 164 of the shield 132 with a lower end 144 of the cover plate 114. The cam 200 should be in a parallel position to the oval cutout 190 as shown in FIG. 17. An upper end 162 of the shield 132 is inserted into the recessed cavity 188 (FIG. 22) and the shield 132 slid upwardly until its upper limit. The pair of hooks 134 slidably engage into the slots 118 in the box-like member 117 and the shield 132 slid downwardly to the lower limits with a front surface of the shield 132 at the upper and lower ends 162 and 164 substantially flush against a rear surface 183 of the retaining lip 182 defined by the cover plate (FIG. 22a). When the cam 200 is behind the rear wall 184 of the box-like member 117, the key (not shown) is then turned in the keyway 196 pivoting the cam 200 to a substantially perpendicular position with respect to the oval cutout 190 to lock the shield 132 into a locked position on the base in a position over the at least one fastener 28 (FIG. 22b) to substantially prevent access thereto. As with locking cap 10, access to the utility pole wiring may be necessary for maintenance and repair. An authorized user would turn the key in the keyway 196 to pivot the cam 200 to a position parallel to the oval cutout 190 and move the lock core 198 into a forward position. The shield 132 can then be slid toward an upper end 142 of the cover plate to disengage the hooks 134 and permit withdrawal of the lower end 164 of the shield 132 from behind the retaining lip 182 at the bottom edge of the substantially square cutout in the cover plate and then slid to withdraw the upper end of the shield from behind the retaining lip at the top edge of the substantially square cutout in the cover plate. The shield 132 may then be removed from the base 112 thus exposing the at least one fastener 28 to removal tools. The locking cap 110 may thus be removed from the utility pole 30 to uncover the access opening to access the wiring.

From the foregoing, it is to be appreciated that the locking caps 10 and 110 of this invention greatly reduces the probability of metal theft from utility poles by substantially preventing access to at least a portion of the lock thus increasing the difficulty of breaking or otherwise removing the lock. In addition, the locking cap of this invention substantially prevents access to the at least one fastener used to detachably mount the locking cap to the utility pole. The locking cap 10 and 110 are preferably made from a strong and resilient material such as a metal alloy or the like, preferably carbon steel or stainless steel to substantially prevent the locking cap from rusting.

Although a particular embodiment of the invention has been described in detail for purposes of illustration, various modifications may be made without departing from the spirit and scope of the invention. Accordingly, the invention is not to be limited, except as by the appended claims.

We claim:

1. A locking cap for a utility pole comprising:
a base adapted to be detachably mounted to the utility pole by at least one fastener and having a plurality of slots therethrough; and
a shield adapted to be locked to the base and having a plurality of hooks each adapted to slidably engage into the plurality of slots to position the shield over the at least one fastener to substantially prevent access thereto;
wherein the base comprises a cover plate and an underlying brace member having rearwardly extending top, bottom and side flanges, and at least one opening adapted to receive the at least one fastener therethrough for detachably mounting the locking cap to the utility pole.

2. The locking cap of claim 1, wherein the base further comprises a box-like member mounted to a rear surface of the cover plate, the box-like member having the plurality of slots at a rear wall where joined to forwardly extending top, bottom and side flanges, the rear wall further including a cutout and the at least one opening therein and the cover plate and underlying brace member including substantially vertically aligned cutouts that with the box-like member cooperatively define a recessed cavity in the base for receiving the shield.

3. The locking cap of claim 2, wherein the cutout in the cover plate comprises a substantially square cover plate cutout and the cutout in the underlying brace member comprises a substantially rectangular brace member, with the top and bottom edges of the cover plate cutout defining a retaining lip over the recessed cavity.

4. The locking cap of claim 3, wherein the shield comprises a substantially rectangular front wall having a cam lock therethrough and joined to a pair of rearwardly extending side flanges having the plurality of hooks extending rearwardly therefrom, the shield adapted to be locked behind and against the retaining lip and a cam of the cam lock rotated to a locked position through and behind the cutout in the rear wall of the box-like member.

5. The locking cap of claim 1, wherein the plurality of hooks correspond in lateral spacing and in vertical spacing to the positioning of the plurality of slots in the base.

6. The locking cap of claim 1, wherein the plurality of slots are vertically aligned and the shield includes a substantially rectangular front wall and a pair of inclined sidewalls sloping downwardly toward an upper end of the shield with the plurality of hooks projecting rearwardly from the edges of the inclined sidewalls and one of the base and shield has a staple projecting therefrom with a staple opening adapted to receive a padlock and the other one of the base and shield has a retaining flange adapted to cooperate with the staple opening to secure the padlock therein to lock the shield to the base in the position over the at least one fastener and further over at least a portion of the padlock.

7. A locking cap for a utility pole comprising:
a base adapted to be detachably mounted to the utility pole by at least one fastener and defining a forwardly open recessed cavity, and a plurality of slots therethrough; and a shield adapted to be locked in a position closing the forwardly open recessed cavity in a position overlying that at least one fastener, the shield having a plurality of hooks each adapted to slidably engaged into the plurality of slots in a position overlying the at least one fastener;

wherein the base comprises a substantially planar cover plate, an underlying brace member having rearwardly extending top, bottom and side flanges and a box-like member mounted to a rear surface of the cover plate, the box-like member having the plurality of slots at a rear wall where joined to forwardly extending top, bottom and side flanges, the rear wall further including a cutout and the at least one opening therein and the cover plate and underlying brace member including substantially vertically aligned cutouts that with the box-like member cooperatively define the forwardly open recessed cavity.

8. The locking cap of claim 7, wherein the base further comprises at least one opening adapted to receive the at least one fastener therethrough for detachably mounting the locking cap to the utility pole.

9. The locking cap of claim 7, wherein the cutout in the cover plate comprises a substantially square cover plate cutout and the cutout in the underlying brace member comprises a substantially rectangular cutout, with the top and bottom edges of the cover plate cutout defining a retaining lip over the forwardly open recessed cavity.

10. The locking cap of claim 9, wherein the shield comprises a substantially rectangular front wall having a cam lock therethrough and joined to a pair of rearwardly extending side flanges having the plurality of hooks extending rearwardly therefrom, the shield adapted to be locked behind and against the retaining lip and a cam of the cam lock rotated to a locked position through and behind the cutout in the rear wall of the box-like member.

11. The locking cap of claim 7, further comprising a cutout in a rear wall of the base.

12. The locking cap of claim 11, wherein forwardly open recessed cavity has a retaining lip at an upper and lower edge.

13. The locking cap of claim 12, wherein the shield comprises a substantially rectangular front wall having a camlock therethrough and joined to a pair of rearwardly extending side flanges having the plurality of hooks extending rearwardly therefrom, the shield adapted to be locked behind and against the retaining lip and a cam of the cam lock rotated to a locked position though and behind the cutout in the rear wall of the base.

14. A method of safeguarding metal wiring within a utility pole using a locking cap comprising the steps of:

Providing a locking cap having a base with a plurality of slots therethrough and a shield adapted to be locked to the base in a position overlying at least one fastener, the base comprising a cover plate and an underlying brace member with top, bottom and side flanges and the shield having a plurality of hooks;

Inserting the top, bottom and side flanges of the brace member into an access opening in the utility pole with the cover plate over the access opening;

Mounting the base to the utility pole by fastening the at least one fastener through the at least one opening in the base; and Locking the shield to the base;

wherein the plurality of slots comprise a plurality of vertically aligned slots in the base and one of the shield and base has a staple projecting therefrom with a staple opening adapted to receive a lock and the other one of the base and shield has a retaining flange adapted to cooperate with the staple opening to secure the lock therein to fasten the shield to the base in a position overlying the lock;

and wherein the step of locking the shield to the base comprises:

Inserting a lock shackle into the staple opening;

Inserting the plurality of hooks into the plurality of vertically aligned slots and the retaining flange through the lock shackle;

Slidably engaging the plurality of hooks into the plurality of vertically aligned slots and the retaining flange abutting the staple to secure the shackle in the staple opening; and Locking the lock shackle.

15. The method of claim 14, wherein the base further comprises a box-like member mounted to a rear surface of the cover plate, the box-like member having the plurality of slots at a rear wall where joined to forwardly extending top, bottom and side flanges, the rear wall further including a cutout and the at least one opening therein and the cover plate and underlying brace member including substantially vertically aligned cutouts that with the box-like member cooperatively define a recessed cavity in the base, the cutout in the cover plate comprising a substantially square cover plate cutout and the cutout in the underlying brace member comprising a substantially rectangular cutout, with top and bottom edges of the cover plate cutout defining a retaining lip over the recessed cavity and the shield comprises a substantially rectangular front wall having a cam lock therethrough and joined to a pair of rearwardly extending side flanges having the plurality of hooks extending rearwardly therefrom, and wherein the step of locking the shield to the base comprises:

orienting a lower end of the shield with a lower end of the base;

rotating a cam of the cam lock to be oriented in the same direction as the cutout in the rear wall;

inserting an upper end of the shield into the recessed cavity;

slidably engaging the plurality of hooks into the plurality of slots and sliding the shield until the shield is retained by the retaining lip;

rotating the cam to a locked position behind the rear wall of the box-like member.

* * * * *